United States Patent
Levy et al.

(10) Patent No.: US 9,674,102 B2
(45) Date of Patent: Jun. 6, 2017

(54) METHODS AND NETWORK DEVICE FOR OVERSUBSCRIPTION HANDLING

(71) Applicant: Marvell Israel (M.I.S.L) Ltd., Yokneam (IL)

(72) Inventors: Gil Levy, Hod Hasharon (IL); Aviran Kadosh, Misgav (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 159 days.

(21) Appl. No.: 14/575,855

(22) Filed: Dec. 18, 2014

(65) Prior Publication Data

US 2015/0172198 A1     Jun. 18, 2015

Related U.S. Application Data

(60) Provisional application No. 61/917,824, filed on Dec. 18, 2013, provisional application No. 61/924,369, filed on Jan. 7, 2014.

(51) Int. Cl.

| H04W 4/00 | (2009.01) |
|---|---|
| H04L 12/823 | (2013.01) |
| H04L 29/06 | (2006.01) |
| H04L 12/801 | (2013.01) |
| H04L 12/851 | (2013.01) |
| H04L 12/861 | (2013.01) |

(52) U.S. Cl.
CPC ............. H04L 47/32 (2013.01); H04L 47/11 (2013.01); H04L 47/24 (2013.01); H04L 69/12 (2013.01); H04L 69/22 (2013.01); *H04L 49/9042* (2013.01)

(58) Field of Classification Search
CPC ........... H04L 47/11; H04L 47/32; H04L 69/22

USPC .................. 370/230, 232, 252, 389, 392
See application file for complete search history.

(56) References Cited

U.S. PATENT DOCUMENTS

| 6,687,247 B1 | 2/2004 | Wilford et al. |
| 6,721,316 B1 | 4/2004 | Epps et al. |

(Continued)

FOREIGN PATENT DOCUMENTS

| EP | 1158730 A2 | 11/2001 |
| EP | 1432181 A2 | 6/2004 |

(Continued)

OTHER PUBLICATIONS

International Search Report and Written Opinion in International Application No. PCT/IB2014/003256, dated Aug. 7, 2015 (11 pages).

(Continued)

*Primary Examiner* — Farah Faroul

(57) ABSTRACT

Header information is extracted from a received packet by a data path portion of a network device. The data path portion is configured to buffer a data portion of received packets until the received packets are ready for transmission from the network device. The data path portion determines a first classification identifier for the received packet based on the header information. The data path portion determines a congestion state of the data path portion. The congestion state indicates a received packet rate of the first data path portion that exceeds a packet handling rate of a control path portion of the network device. The data path portion discards the first packet if the congestion state meets a discard threshold associated with the first classification identifier.

20 Claims, 5 Drawing Sheets

(56) References Cited

U.S. PATENT DOCUMENTS

| | | | |
|---|---|---|---|
| 2002/0118667 A1* | 8/2002 | Chintada | H04L 1/1621 370/349 |
| 2008/0114887 A1 | 5/2008 | Bryers et al. | |
| 2009/0080428 A1* | 3/2009 | Witkowski | H04L 49/352 370/392 |
| 2013/0308458 A1* | 11/2013 | Francini | H04L 49/90 370/235 |
| 2014/0169378 A1 | 6/2014 | Shumsky et al. | |
| 2014/0192815 A1 | 7/2014 | Shumsky et al. | |
| 2014/0286352 A1 | 9/2014 | Turgeman et al. | |
| 2015/0016266 A1* | 1/2015 | Dumitrescu | H04L 47/623 370/236 |
| 2015/0333991 A1* | 11/2015 | Liu | H04L 43/0835 455/406 |

FOREIGN PATENT DOCUMENTS

| | | |
|---|---|---|
| WO | WO-99/00949 A1 | 1/1999 |
| WO | WO-2007/050283 A2 | 5/2007 |

OTHER PUBLICATIONS

IEEE P802.1aq/D4.6, Draft Amendment to IEEE Std 802.1Q-2011, "IEEE Draft Standard for Local and Metropolitan Area Networks—Media Access Control (MAC) Bridges and Virtual Bridged Local Area Networks—Amendment XX: Shortest Path Bridging," *The Institute of Electrical and Electronics Engineers, Inc.*, 363 pages (Feb. 10, 2012).

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, 60 pages, (Aug. 17, 2005).

IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Sections 1-5 (Dec. 9, 2005).

IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation *The Institute of Electrical and Electronics Engineers, Inc.*, 540 pages (May 1, 2002).

Chen, "Home Network Basis: Transmission Environments and Wired/Wireless Protocols," Prentice Hall, 26 pages (Jul. 2003).

U.S. Appl. No. 14/574,088, filed Dec. 17, 2014.
U.S. Appl. No. 14/574,214, filed Dec. 17, 2014.
U.S. Appl. No. 14/515,363, filed Oct. 15, 2014.

* cited by examiner

METHODS AND NETWORK DEVICE FOR OVERSUBSCRIPTION HANDLING

CROSS-REFERENCES TO RELATED APPLICATIONS

This application claims the benefit of U.S. Provisional Patent Application No. 61/917,824, entitled "Two layer control path oversubscription architecture," filed on Dec. 18, 2013, and U.S. Provisional Patent Application No. 61/924,369, entitled "Management of Compute Resources in a Network Device," filed on Jan. 7, 2014, the disclosures of both of which are incorporated herein by reference in their entireties.

FIELD OF THE DISCLOSURE

The present disclosure is related generally to communication networks and, more particularly, to network devices that process packets with reduced latency.

BACKGROUND

Some network devices process packets using a data path and a control path. The data path generally buffers data for received packets until the packets are transmitted from the network device, while the control path generally processes header information for the packets to determine a port of the network device from which the packet should be transmitted. Throughput of the data path is measured as a data rate (e.g., bytes per second) or as a packet rate (e.g., packets per second). The packet rate of the data path is affected by the data rate and also a size of the packets being processed. For example, for a same data rate of a stream of packets, the packet rate is relatively higher for a first packet size than for a second packet size that is larger than the first packet size. Throughput of the control path is based on the processing operations performed on the packets and is measured as a packet rate. Performance of the network device is generally improved by mitigating various bottlenecks associated with the data path and/or the control path.

SUMMARY

In an embodiment, a method for processing packets in a network device includes extracting at least first header information from a first packet received by a first data path portion of the network device. The first data path portion configured to buffer a data portion of received packets until the received packets are ready for transmission from the network device. The method includes determining, by the first data path portion, a first classification identifier for the first packet based on the first header information. The method also includes determining, by the first data path portion, a congestion state of the first data path portion. The congestion state indicates a received packet rate of the first data path portion that exceeds a packet handling rate of a control path portion of the network device. The method includes discarding the first packet by the first data path portion, if the congestion state meets a discard threshold associated with the first classification identifier.

In other embodiments, the method includes any suitable combination of one or more of the following features.

The method further includes: parsing at least one first header field from the first packet based on a predetermined packet protocol definition; and selecting the first classification identifier for the first packet from a set of classification values based on a pattern match of the at least one first header field.

The method further includes: scheduling the first header information for processing by the control path portion of the network device if the first packet is not discarded, the control path portion being configured to process at least header information for the received packets to determine respective ports of the network device from which the received packets should be transmitted.

The method further includes: parsing the first header information by a header parser to determine the first classification identifier; sending the first header information, by the header parser, directly to a header scheduler of the first data path portion if the first classification identifier has a first value of a set of classification values; and sending the first header information, by the header parser, to the header scheduler via a header buffer of the first data path portion if the first classification identifier has a second value of the set of classification values that corresponds to the header buffer.

The method further includes: selecting the header buffer from a plurality of header buffers, each header buffer of the plurality of header buffers corresponding to a classification value of the set of classification values.

The method further includes sending header information to the control path portion, by the header scheduler, from i) the plurality of header buffers and ii) the header parser based on a priority schedule for the set of classification values.

The method further includes: sending the first header information directly to the header scheduler if the first classification identifier has the first value of the set of classification values, the first value corresponding to a low latency packet classification.

The method further includes: determining a current fill level of the header buffer as the congestion state; and triggering a flow control message to be transmitted to a sending device if the current fill level meets a flow control threshold.

The method further includes: determining a current fill level of the header buffer as the congestion state; determining, by the control path portion, a second classification identifier for the first packet based on the first header information; and causing the first packet to be discarded if the current fill level meets a discard threshold associated with the second classification identifier.

The method further includes: parsing at least one second header field from the first packet based on a reconfigurable packet protocol definition; and selecting the second classification identifier for the first packet based on the at least one second header field parsed.

The method further includes: determining the second classification identifier by the control path portion based on flow characteristics associated with the first packet.

The method further includes: determining the second classification identifier by the control path portion based on a content addressable memory lookup.

The method further includes: adjusting the discard threshold based on the congestion state.

The congestion state is a congestion state of the first data path portion and the method further includes: extracting, by a second data path portion of the network device and for use by the control path portion, at least second header information from a second packet received by the second data path portion; determining, by the second data path portion, a second classification identifier for the second packet based on the second header information; determining, by the second data path portion, a congestion state of the second data path portion; and selectively discarding the second packet if the congestion state of the second data path portion meets a discard threshold associated with the second classification identifier or sending the second header information from the second data path portion to the control path portion.

In another embodiment, a network device includes a control path portion configured to process at least header information for received packets to determine respective ports of the network device from which the received packets should be transmitted. The network device also includes a first data path portion configured to: buffer at least a data portion of the received packets until the received packets are ready for transmission from the network device, extract first header information from a first packet received by the first data path portion, determine a first classification identifier for the first packet based on the first header information, determine a congestion state of the first data path portion, the congestion state indicating a received packet rate of the first data path portion that exceeds a packet handling rate of the control path portion, and discard the first packet, if the congestion state meets a discard threshold associated with the first classification identifier.

In other embodiments, the apparatus includes any suitable combination of one or more of the following features.

The first data path portion includes a parser configured to schedule the first header information for processing by the control path portion of the network device if the first packet is not discarded.

The parser includes a header scheduler, and a header parser configured to i) parse the first header information, ii) send the first header information directly to the header scheduler if the first classification identifier has a first value of a set of classification values, and iii) send the first header information to the header scheduler via a header buffer of the parser if the first classification identifier has a second value of the set of classification values that corresponds to the header buffer.

The header parser is configured to select the header buffer from a plurality of header buffers, each header buffer of the plurality of header buffers corresponding to a classification value of the set of classification values.

The header scheduler is configured to send the header information from i) the plurality of header buffers and ii) the header parser based on a priority schedule for the set of classification values.

The first data path portion is configured to i) parse at least one first header field from the first received packet based on a predetermined packet protocol definition, and ii) select the first oversubscription classification identifier for the first received packet from a set of classification values based on the at least one first header field.

In an embodiment, a method for processing packets in a network device includes extracting, by a first data path portion of the network device and for a control path portion of the network device, first header information from a first received packet. The first data path portion is configured to buffer a data portion of received packets until the received packets are ready for transmission from the network device. The control path portion configured to process header information for the received packets to determine respective ports of the network device from which the received packets should be transmitted. The method further includes determining, by the first data path portion, a first oversubscription classification identifier for the first received packet based on the first header information. The method also includes determining, by the first data path portion, a congestion state of the network device. The congestion state indicates a received packet rate of the first data path portion that exceeds a packet handling rate of the control path portion. The method further includes selectively discarding the first received packet if the congestion state meets a discard threshold associated with the first oversubscription classification identifier or sending the first header information from the first data path portion to the control path portion.

In other embodiments, the method includes any suitable combination of one or more of the following features.

The method further includes: parsing at least one first header field from the first received packet based on a predetermined packet protocol definition; and selecting the first oversubscription classification identifier for the first received packet from a set of classification values based on a pattern match of the at least one first header field.

The method further includes: sending the first header information directly to a header scheduler of the first data path portion if the first oversubscription classification identifier has a first classification value; sending the first header information to the header scheduler via a header buffer of the first data path portion, the header buffer corresponding to a second classification value, if the first oversubscription classification identifier has the second classification value; and sending the first header information, received from i) the header parser or ii) the header buffer, to the control path portion based on a priority schedule and the corresponding first oversubscription classification identifier.

The method further includes: sending the first header information directly to the header scheduler if the first oversubscription classification identifier has the first classification value, the first classification value corresponding to a low latency packet classification.

The method further includes: determining a current fill level of the header buffer as the congestion state; and triggering a flow control message to be transmitted to a sending device if the current fill level meets a flow control threshold.

The method further includes: discarding the first received packet if the current fill level meets the discard threshold associated with the first oversubscription classification identifier.

The method further includes: determining a current fill level of the header buffer as the congestion state; sending the current fill level to the control path portion; and causing, by the control path portion, at least one packet to be discarded if the current fill level meets the discard threshold.

The method further includes: determining a current fill level of the header buffer as the congestion state; determining, by the control path portion, a second oversubscription classification identifier for the first received packet based on the first header information; and causing the first received packet to be discarded if the current fill level meets a discard threshold associated with the second oversubscription classification identifier.

The method further includes: parsing at least one second header field from the first received packet based on a reconfigurable packet protocol definition; and selecting the second oversubscription classification identifier for the first received packet based on the at least one second header field parsed.

The method further includes: determining the second oversubscription classification identifier by the control path portion based on flow characteristics associated with the first received packet.

The method further includes: determining the second oversubscription classification identifier by the control path portion based on a content addressable memory lookup.

The congestion state is a congestion state of the first data path portion and the method further includes extracting, by a second data path portion of the network device and for the control path portion, second header information from a second received packet; determining, by the second data path portion, a second oversubscription classification identifier for the second received packet based on the second header information; determining, by the second data path portion, a congestion state of the second data path portion; and selectively discarding the second received packet if the congestion state of the second data path portion meets a discard threshold associated with the second oversubscription classification identifier or sending the second header information from the second data path portion to the control path portion.

In another embodiment, a network device includes a control path portion configured to process header information for received packets to determine respective ports of the network device from which the received packets should be transmitted. The network device also includes a first data path portion configured to buffer a data portion of the received packets until the received packets are ready for transmission from the network device, extract first header information from a first received packet, determine a first oversubscription classification identifier for the first received packet based on the first header information, determine a congestion state of the first data path portion, the congestion state indicating a received packet rate of the first data path portion that exceeds a packet handling rate of the control path portion, and selectively discard the first received packet if the congestion state meets a discard threshold associated with the first oversubscription classification identifier or send the first header information to the control path portion for packet processing.

In other embodiments, the apparatus includes any suitable combination of one or more of the following features.

The first data path portion includes a header parser configured to i) parse at least one first header field from the first received packet based on a predetermined packet protocol definition and ii) select the first oversubscription classification identifier for the first received packet from a set of classification values based on a pattern match of the at least one first header field.

The first data path portion further includes i) a header scheduler and ii) at least one header buffer. Each header buffer of the at least one header buffer corresponds to a classification value of the set of classification values. The header scheduler is configured to send packet header information, received from i) the header parser or ii) the at least one header buffer, to the control path portion based on a priority schedule and the corresponding first oversubscription classification identifier. The header parser is configured to send the first header information i) to the header scheduler if the first oversubscription classification identifier has a first classification value or ii) to a header buffer of the at least one header buffer that corresponds to a second classification value if the first oversubscription classification identifier has the second classification value.

The at least one header buffer is a first in, first out (FIFO) buffer.

The header parser is configured to send the first header information directly to the header scheduler if the first oversubscription classification identifier has the first classification value, the first classification value corresponding to a low latency packet classification.

The first data path portion further includes a buffer controller configured to i) determine a current fill level of the at least one header buffer as the congestion state, and ii) trigger a flow control message to be transmitted to a sending device if the current fill level meets a flow control threshold.

The header parser is configured to discard the first received packet if the current fill level meets the discard threshold associated with the first oversubscription classification identifier.

The first data path portion further includes a buffer controller configured to i) determine a current fill level of the at least one header buffer as the congestion state and ii) send the current fill level to the control path portion. The control path portion comprises a priority controller configured to cause at least one packet to be discarded if the current fill level meets the discard threshold.

The control path portion includes a packet processing array configured to i) determine a second oversubscription classification identifier for the first received packet based on the first header information, and ii) cause the first received packet to be discarded if the current fill level meets a discard threshold associated with the second oversubscription classification identifier.

The packet processing array includes a priority controller that is configured to i) parse at least one second header field from the first received packet based on a reconfigurable packet protocol definition, and ii) select the second oversubscription classification identifier for the first received packet based on the at least one second header field parsed from the first received packet.

The packet processing array is configured to determine the second oversubscription classification identifier based on flow characteristics associated with the first received packet.

The packet processing array is configured to determine the second oversubscription classification identifier based on a content addressable memory lookup.

The network device further includes a second data path portion configured to: extract second header information from a second received packet, determine a second oversubscription classification identifier for the second received packet based on the second header information, determine a congestion state of the second data path portion, and selectively discard the first received packet if the congestion state meets a discard threshold associated with the second oversubscription classification identifier or send the second header information to the control path portion for packet processing by the control path portion.

In an embodiment, a method for processing packets in a network device includes extracting first header information from a first packet received by a first data path portion of the network device. The first data path portion configured to buffer a data portion of received packets until the received packets are ready for transmission from the network device. The method also includes determining, by the first data path portion, a first classification identifier for the first packet based on the first header information. The method includes determining, by the first data path portion, a congestion state of the first data path portion. The congestion state indicates a received packet rate of the first data path portion that exceeds a packet handling rate of the control path portion. The method further includes discarding the first packet by the first data path portion, if the congestion state meets a discard threshold associated with the first classification identifier.

In other embodiments, the method includes any suitable combination of one or more of the following features.

The method further includes scheduling the first header information for processing by a control path portion of the network device if the first packet is not discarded, the control path portion being configured to process header information for the received packets to determine respective ports of the network device from which the received packets should be transmitted.

The method further includes: parsing the first header information by a header parser to determine the first classification identifier based on a pattern match; sending the first header information, by the header parser, directly to a header scheduler of the first data path portion if the first classification identifier has a first value of a set of classification values; and sending the first header information, by the header parser, to the header scheduler via a header buffer of the first data path portion if the first classification identifier has a second value of the set of classification values that corresponds to the header buffer.

The method further includes: selecting the header buffer from a plurality of header buffers. Each header buffer of the plurality of header buffers corresponding to a classification value of the set of classification values.

The method further includes: sending header information, by the header scheduler, from i) the plurality of header buffers and ii) the header parser based on a priority schedule for the set of classification values.

The method further includes: adjusting the discard threshold based on the congestion state.

The method further includes: parsing at least one first header field from the first received packet based on a predetermined packet protocol definition; and selecting the first oversubscription classification identifier for the first received packet from a set of classification values based on a pattern match of the at least one first header field.

In another embodiment, a network device includes a control path portion configured to process header information for received packets to determine respective ports of the network device from which the received packets should be transmitted. The network device further includes a first data path portion configured to: buffer a data portion of the received packets until the received packets are ready for transmission from the network device, extract first header information from a first packet received by the first data path portion, determine a first classification identifier for the first packet based on the first header information, determine a congestion state of the first data path portion, the congestion state indicating a received packet rate of the first data path portion that exceeds a packet handling rate of the control path portion, and discard the first packet if the congestion state meets a discard threshold associated with the first classification identifier.

In other embodiments, the apparatus includes any suitable combination of one or more of the following features.

The first data path portion includes a parser configured to schedule the first header information for processing by the control path portion of the network device if the first packet is not discarded.

The parser includes: a header scheduler, and a header parser configured to i) parse the first header information, ii) send the first header information directly to the header scheduler if the first classification identifier has a first value of a set of classification values, and iii) send the first header information to the header scheduler via a header buffer of the parser if the first classification identifier has a second value of the set of classification values that corresponds to the header buffer.

The header parser is configured to select the header buffer from a plurality of header buffers, each header buffer of the plurality of header buffers corresponding to a classification value of the set of classification values.

The header scheduler is configured to send the header information from i) the plurality of header buffers and ii) the header parser based on a priority schedule for the set of classification values.

The first data path portion is configured to adjust the discard threshold based on the congestion state.

The first data path portion is configured to i) parse at least one first header field from the first received packet based on a predetermined packet protocol definition, and ii) select the first oversubscription classification identifier for the first received packet from a set of classification values based on the at least one first header field.

DETAILED DESCRIPTION

For network devices that utilize a control path and a data path, in some cases the packet rate of the control path is not aligned to the maximum packet rate of the data path, which is derived from a maximum data rate and a minimum packet size for the data path, in some embodiments. Oversubscription of the control path includes scenarios where the ingress packet rate of the data path is higher than the packet rate capable of being handled by the control path, which results in congestion of the packets. In one scenario, a temporary congestion state occurs when a temporary ingress packet rate exceeds the control path packet rate while the average ingress packet rate is less than or equal to the packet rate capable of being handled by the control path. In another scenario, a permanent congestion state occurs when the average ingress packet rate exceeds the packet rate capable of being handled by the control path.

In embodiments described below, a network device (e.g., a bridge, router, network switch, or any other suitable network device) is configured with a control path and a data path. The network device is configured to provide burst absorption for temporary congestion, in various embodiments. For example, in an embodiment, the network device selectively buffers packets within the data path, prior to delay processing by the control path, based on a determined packet priority. In some embodiments, the network device is configured to process packets according to a quality of service based on the determined packet priority. For example, in an embodiment, the network device discards packets having a packet priority that does not meet a predetermined threshold. In some embodiments, the network device is configured to send flow control messages to sending device to reduce the ingress packet rate.

Figure 1:
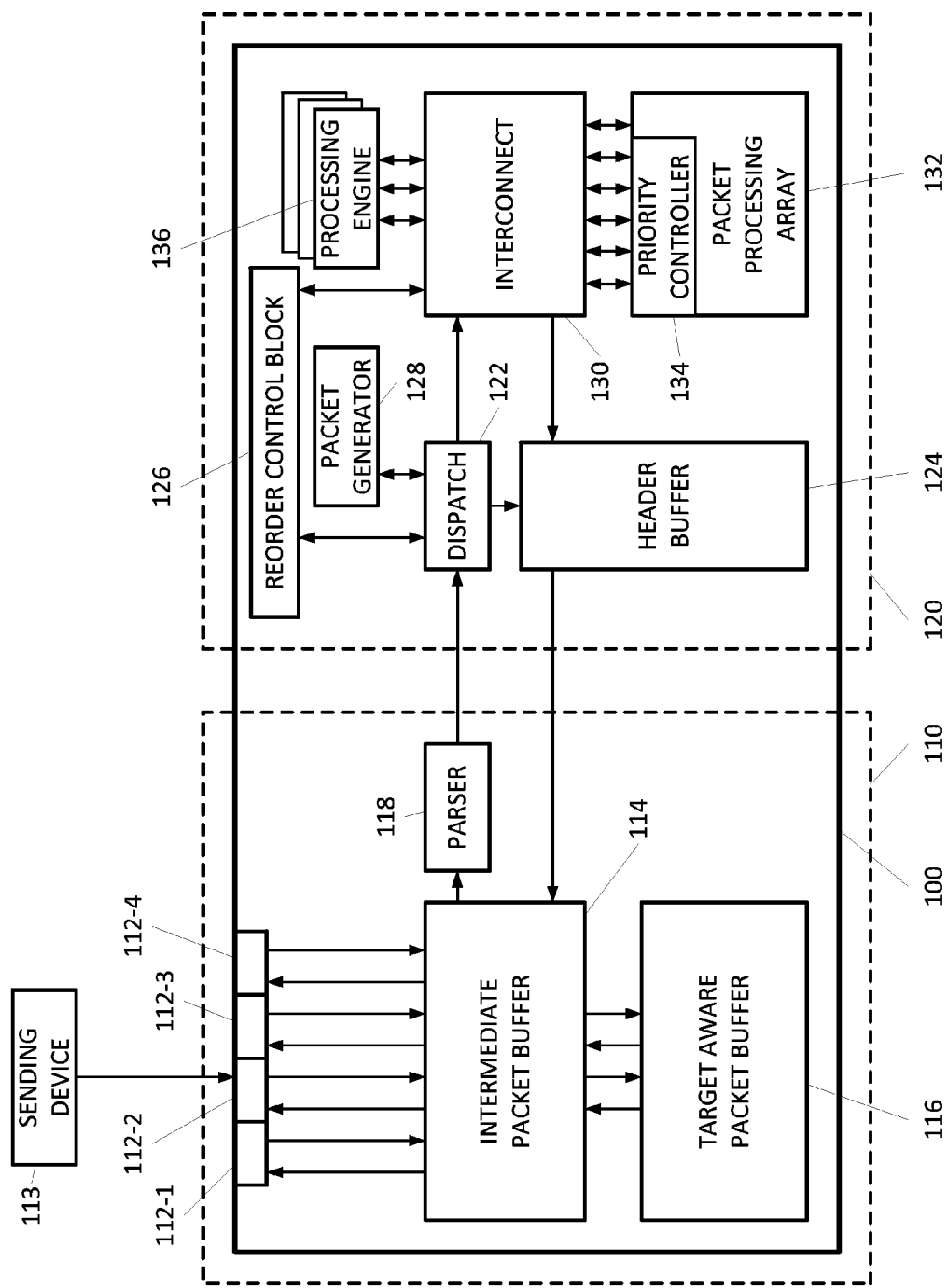
FIG. 1 is a block diagram of an example network device in which network packet processing techniques for oversubscription of the present disclosure are implemented, according to an embodiment.

FIG. 1 is a simplified block diagram of an example network device 100 in which network packet processing techniques of the present disclosure may be implemented, according to an embodiment. The network device 100 is a bridge, router, network switch, or any other suitable network device configured to operate within a networked environment, in various embodiments. The network device 100 is configured with a data path portion 110 and a control path portion 120. In an embodiment, the data path portion 110 buffers data for received packets until the packets are transmitted from the network device 100 and the control path portion 120 generally processes header information for the packets to determine a port of the network device 100 from which the packet should be transmitted.

The data path portion 110 includes multiple ports 112 that provide at least one network interface to external devices. In some embodiments, each of ports 112-1, 112-2, 112-3, and 112-4 is a respective bidirectional port that can selectively act as either an ingress port, an egress port, or both an ingress port and egress port. In other embodiments, ports are dedicated to be either ingress ports or egress ports. For instance, port 112-1 and 112-2 are dedicated ingress ports and ports 112-3 and 112-4 are dedicated egress ports, in an embodiment. While FIG. 1 only shows four ports, in other embodiments network device 100 includes a suitable number of ports more than four or less than four. In the embodiment shown in FIG. 1, the port 112-2 is communicatively coupled with a sending device 113 that sends packets to the network device 100 for processing, as described herein. In other embodiments, additional sending devices are coupled with the network device 100.

In the example embodiment of FIG. 1, the ingress ports 112 are communicatively coupled to an intermediate packet buffer 114 of the data path portion 110. In an embodiment, the intermediate packet buffer 114 stores data for packets received from sending devices, such as the sending device 113, at least while the packet is being received. In some embodiments, the intermediate packet buffer 114 stores received packets while header information of the ingress packets is processed. In an embodiment, the network device 100 transfers the data for a received packet to a target aware packet buffer 116 of the data path portion 110. For example, in an embodiment, the intermediate packet buffer 114 transfers the data for the received packet to the target aware packet buffer 116 after an egress port (i.e., a target port) for the packet is determined by the control path portion 120 and thus the target aware packet buffer 116 stores the packet while the packet is queued for transmission from the egress port. In some embodiments and/or scenarios, determination of the egress port by the control path portion 120 is made before the entire packet is received, and transference of packet data to the target aware packet buffer 116 begins prior to the entire packet being received. In other embodiments and/or scenarios, however, determination of the egress port by the control path portion 120 and/or beginning transfer of packet data to the target aware packet buffer 116 does not occur until after the entire packet is received.

The data path portion 110 is configured to extract header information for received packets, in various embodiments. In an embodiment, the data path portion 110 includes a parser 118 that extracts the header information from the received packet. In some embodiments, the data path portion 110 determines an oversubscription (OS) classification identifier for the received packet based on the first header information. The OS classification identifier is a value that indicates to the data path portion 110 and/or the control path portion 120 how the packet should be handled when the network device 100 is oversubscribed, for example, when the ingress packet rate of the data path portion 110 is higher than the packet rate capable of being handled by the control path portion 120, which results in congestion of the packets and/or increased latency in handling the packets. In various embodiments, the packet is discarded, queued for processing, or processed without being queued based on the value of the OS classification identifier. The OS classification identifier allows for preferred handling of high priority packets, such as low latency packets. Discarding packets helps to reduce an amount of data sent to the control path portion 120, in an embodiment. In some embodiments, the reduced amount of data allows for an interface between the data path portion 110 and the control path portion 120 to be designed with a lower maximum bandwidth and/or data rate.

In some embodiments, the parser 118 is configured to determine the OS classification identifier for the received packet based on the header information. In an embodiment, the parser 118 extracts the entire header of the packet as the header information. In another embodiment, the parser 118 extracts a portion of the header (i.e., one or more fields or sub-fields) as the header information. In some embodiments, the parser 118 generates a packet descriptor that includes header information, the packet descriptor corresponding to the packet. The data path portion 110 is configured to determine a congestion state of the data path portion 110, in various embodiments. In an embodiment, the parser 118 determines the congestion state, as described below with respect to FIG. 2. In other embodiments, another suitable component (e.g., other than the parser 118) determines the congestion state. The data path portion 110 is configured to selectively send the header information, the OS classification identifier, and the congestion state to the control path portion 120 for packet processing or perform a different action on the received packet based on the congestion state, in various embodiments. In some embodiments, the data path portion 110 discards the received packet instead of sending the header information, the OS classification identifier, and the congestion state to the control path portion 120, as described below with respect to FIG. 2.

The control path portion 120 includes a dispatch 122, header buffer 124, reorder control block 126, packet generator 128, interconnect 130, packet processing array 132, and processing engine 136. The dispatch 122 is configured to provide the header information to an available processing entity within the packet processing array 132, via the interconnect 130, in an embodiment. The packet processing array 132 includes one or more processors for processing the generated descriptors to perform various operations, in some embodiments. Generally, the packet processing array 132 (e.g., including a bridging engine, in an embodiment) processes header information and/or descriptors, and accesses various routing, forwarding and/or other suitable databases stored in a lookup memory or by the processing engines 136, to perform forwarding operations for the corresponding packets.

The packet processing array 132 includes one or more tangible/physical processors. In a first illustrative embodiment, packet processing array 132 includes one or more processors configured to read and execute software or firmware instructions stored on a tangible, non-transitory, computer-readable memory (e.g., random access memory (RAM), read-only memory (ROM), FLASH memory, etc.), the processors being configured to execute the instructions to perform packet processing operations based on a processing context. In some embodiments, the software or firmware instructions include computer-readable instructions that, when executed by the processor(s), cause the processor(s) to perform any of the various actions of packet processing array 132 described herein. In one such embodiment, various components are implemented as respective software or firmware modules, with each module corresponding to instructions executed by packet processing array 132. In this embodiment, the order of the various components shown in FIG. 1 corresponds to orders of operation rather than physical location.

In another illustrative embodiment, packet processing array 132 is a packet processing pipeline implemented in hardware, such as one or more application-specific integrated circuits (ASICs) or any other suitable type(s) of hardware circuit(s) and/or integrated circuits. In one such embodiment, various modules of the packet processing array 132 are implemented as respective pipeline stages, respective groupings of pipeline stages, or respective portions of pipeline stages within packet processing array 132. In a second embodiment, for example, packet processing array 132 is configured to process packets at least partially in parallel. After being processed by the packet processing array 132, the header information is sent to the header buffer 124 while the packet is queued for transmission. In some embodiments, header information corresponding to packets is reordered within the header buffer 124 by the reorder control block 126.

While only ports 112, intermediate packet buffer 114, target aware packet buffer 116, parser 118, dispatch 122, header buffer 124, reorder control block 126, packet generator 128, interconnect 130, packet processing array 132, priority controller 134, and processing engines 136 are shown for clarity, other embodiments of the network device 100 have a suitable number of additional components or fewer components. In some embodiments, the network device 100 includes multiple data path portions that communicate with multiple control path portions. In an embodiment, the network device 100 includes multiple data path portions that communicate with a same control path portion.

Figure 2:
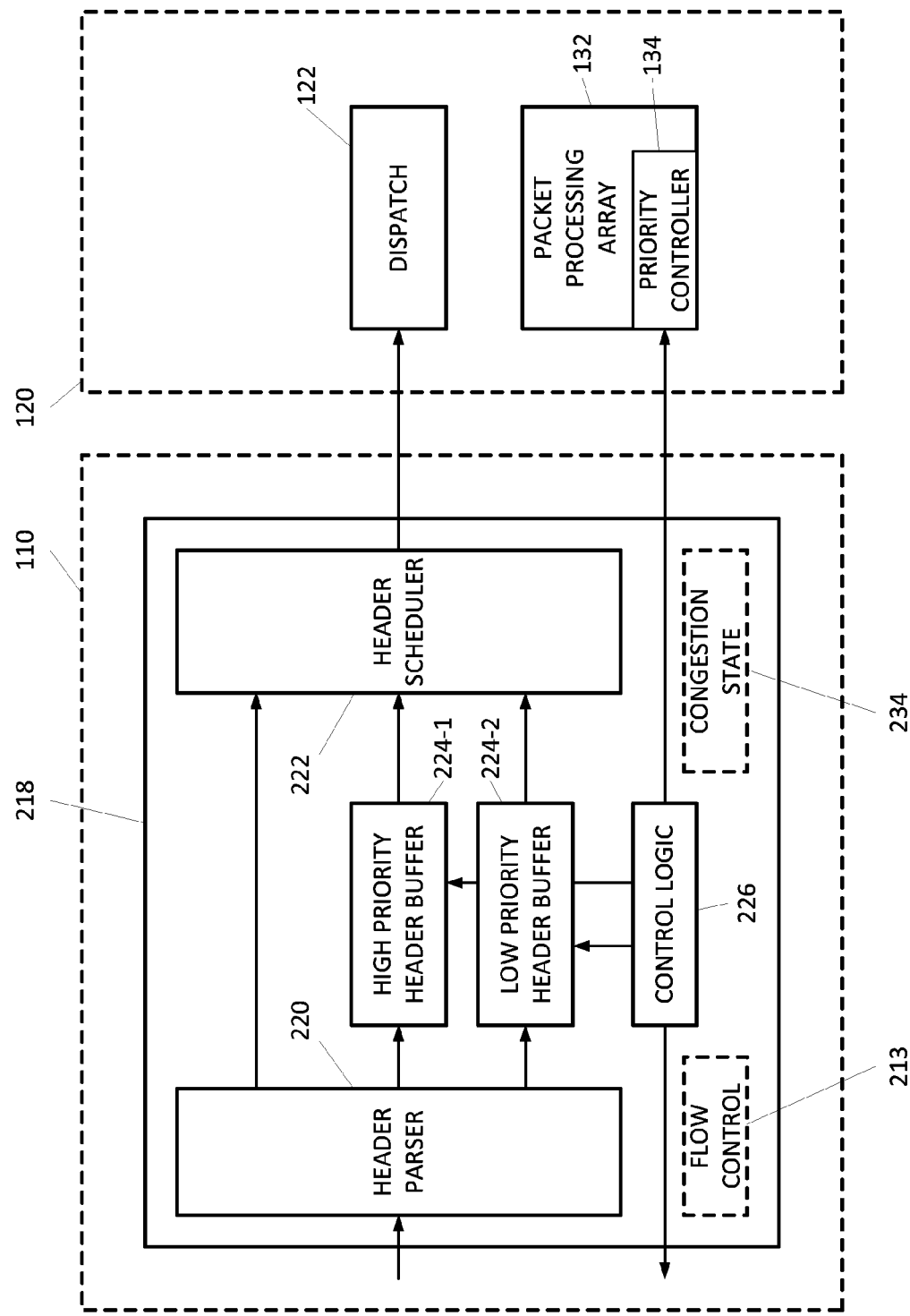
FIG. 2 is a block diagram of an example parser of a network device, according to an embodiment.

FIG. 2 is a block diagram of an example parser 218 of a network device, such as the parser 118 of the network device 100, according to an embodiment. The parser 218 includes a header parser 220, a header scheduler 222, one or more header buffers 224, and control logic 226. The header parser 220 is configured to determine an oversubscription classification identifier for a received packet based at least upon header information for the packet, in various embodiments. In an embodiment, the header parser 220 is configured to parse header information that is received from the intermediate packet buffer 114. In one such embodiment, the intermediate packet buffer 114 parses the header of a packet to extract and provide the header information to the header parser 220. In this case, the header parser 220 further parses the header information to determine the OS classification identifier. In another embodiment, the header parser 220 extracts the header information from the header of the packet. In yet another embodiment, the header parser 220 receives a packet descriptor for the packet from the intermediate packet buffer 114. In one such embodiment, the header parser 220 receives the packet descriptor and modifies the packet descriptor with additional information, such as the OS classification identifier or other suitable information. In an embodiment, the header parser 220 determines other suitable information to be included in the header information, such as source port on which the packet was received and/or a configurable priority associated with the source port.

In an embodiment, the header parser 220 is configured to parse one or more header fields or sub-fields from the received packet based on a predetermined packet protocol definition. Examples of predetermined packet protocol definitions include Ethernet protocol, Internet Protocol (e.g., IPv4 and/or IPv6), Multiprotocol Label Switching (MPLS) protocol, or other suitable protocols. In an embodiment, the header parser 220 parses a packet cast (i.e., unicast, multicast, or broadcast) for a received packet as a portion of the header information. In another embodiment, the header parser 220 parses a virtual local area network (VLAN) tag of an Ethernet frame (i.e., an IEEE 802.1q field) to be included in the header information. In an embodiment, the header parser 220 parses an EXP field (i.e., experimental field for Quality of Service and Explicit Congestion Notification) of an MPLS header to be included in the header information. In another embodiment, the header parser 220 is configured to parse a differentiated services code point (DSCP) of a differentiated services field in an IPv4 or IPv6 header to be included in the header information. In an embodiment, the header parser 220 is configured to parse a traffic class field of an IPv6 header to be included in the header information. In some embodiments, the header parser 220 includes other suitable fields, sub-fields, and/or information in the header information.

The header parser 220 is configured to select the OS classification identifier for the packet from a set of classification values based on the extracted header fields, in various embodiments. In an embodiment, the header parser 220 performs pattern matching of one or more header fields against one or more predetermined patterns. For example, in an embodiment, the header parser 220 performs pattern matching of a VLAN tag of an Ethernet frame against a set of predetermined values that correspond to the set of classification values. In an embodiment, the set of classification values includes a high priority value and a low priority value. For example, in an embodiment, packets associated with the high priority value are less likely to be discarded by the network device 100 as compared to packets associated with the low priority value. In one such example, the header parser 220 determines that packets designated as "low latency packets" should be classified with a high priority value. In another embodiment, the set of classification values includes a separate value for low latency packets (i.e., a low latency value, a high priority value, and a low priority value). In an embodiment, the header parser 220 selects a default value for a packet. For example, in an embodiment, the header parser 220 selects the default value if the packet conforms to an unrecognized packet protocol definition. In other embodiments, the set of classification values includes other suitable values, such as one or more medium priority values arranged between the low priority value and the high priority value.

After determination of the OS classification identifier, in some embodiments, the header parser 220 (or another suitable component of the network device 100) is configured to discard the packet based on the OS classification identifier and a congestion state of the data path portion 110, as described below. If the packet is not discarded, the header parser 220 is configured to send the header information to the header scheduler 222, in various embodiments. In an embodiment, the header parser 220 sends the header information directly to the header scheduler 222 if the OS classification identifier has a first classification value, such as the low latency value, the high priority value, or another suitable value.

In another embodiment, the header parser 220 sends the header information to the header scheduler 222 via a header buffer 224. In one such embodiment, the header parser 222 is configured to select a header buffer 224 that corresponds to a classification value of the OS classification identifier for the packet and sends the header information to the selected header buffer. As an example, FIG. 2 shows an embodiment having a high priority header buffer 224-1 and a low priority header buffer 224-2. In this embodiment, the header parser 220 sends i) a packet having the low latency value directly to the header scheduler 222, ii) a packet having the high priority value to the high priority header buffer 224-1, and iii) a packet having the low priority value to the low priority header buffer 224-2. The header buffers 224 in an embodiment are configured as first in, first out (FIFO) buffers. In other embodiments, the header buffers 224 are configured to use an internal priority schedule. For example, in an embodiment, a single header buffer is configured to buffer header information for two or more classification values (i.e., both high priority and low priority) and to provide the header information to the header scheduler 222 according to the internal priority schedule (e.g., round robin, weighted round robin, class-based queuing, or other suitable schedule).

In other embodiments, the parser 218 includes additional or fewer header buffers. In an embodiment, the parser 218 includes a single header buffer 224 configured as a first in, first out (FIFO) buffer. In this case, the header parser 220 sends header information corresponding to the low latency value directly to the header scheduler 222 and sends header information corresponding to other priority values to the FIFO buffer. In some embodiments where a header buffer 224 includes header information corresponding to multiple priority values (i.e., a single header buffer), the header buffer has multiple discard thresholds, for example, one discard threshold for each priority value. In one such example, a first discard threshold corresponds to a relatively low fill level and causes low priority packets to be discarded, and a second discard threshold corresponds to a relatively high fill level and causes both low priority and high priority packets to be discarded.

The header scheduler 222 is configured to schedule the header information (e.g., packet descriptor or other suitable header information) of a packet for processing by the control path portion 120 if the packet is not discarded, in various embodiments. In an embodiment, the header scheduler 222 receives the header information from i) the header parser 220 (i.e., for low latency packets) or ii) the header buffers 224 and sends the header information to the control path portion 120 (i.e., to the dispatch 122) based on a priority schedule and the corresponding OS classification identifier. In an embodiment, the header scheduler 222 is configured to use a strict priority schedule. In one such embodiment, the header scheduler 222 i) sends low latency header information as soon as possible upon receipt, ii) sends queued high priority header information from the high priority header buffer 224-1 if no low latency header information is available, and iii) sends queued low priority header information from the low priority header buffer 224-2 if no high priority header information is queued. In other embodiments, a round robin, weighted round robin, fair queuing, or other suitable priority schedule is used.

The control logic 226 is configured to determine the congestion state of the data path portion 110, in various embodiments. In an embodiment, the congestion state indicates a received packet rate of the first data path portion that exceeds a packet handling rate of the control path portion. In some embodiments, the control logic 226 is a buffer controller for the header buffers 224. In an embodiment, the congestion state corresponds to a current fill level of the header buffers 224, which indicates an estimated delay in processing of the header information for a packet. In this case, the current fill level represents remaining space within the header buffer 224, a number of bytes stored within the header buffer 224, a number of packets having header information stored within the header buffer 224, or other suitable information. In one such embodiment, each of the header buffers 224 has a respective fill level. In another embodiment, a single fill level indicates an overall fill level of the header buffers 224. In an embodiment, each value of the set of classification values corresponds to a respective fill level (i.e., a high priority fill level, low priority fill level).

The control logic 226 is configured to send the congestion state (i.e., the current fill levels within a congestion state message 234) to the control path portion 120, in various embodiments. For example, in an embodiment, the control logic 226 is configured to send the congestion state to cause at least one packet to be discarded by the control path portion 120 if the current fill level meets a discard threshold. In an embodiment, the control logic 226 sends the congestion state to the priority controller 134 upon the determination of the congestion state. In another embodiment, the control logic 226 sends the congestion state to the priority controller 134 according to a predetermined schedule.

In some embodiments, the control logic 226 is configured to trigger a flow control message 213 to be transmitted to the sending device 113 if the current fill level meets one or more flow control thresholds. In an embodiment, the flow control thresholds correspond to the set of classification identifiers or other suitable identifiers. The flow control message 213 is an IEEE 802.3x compatible flow control message, in an embodiment. In another embodiment, the flow control message 213 is a priority-based flow control (PFC) message. In other embodiments, the flow control message 213 conforms to another suitable flow control protocol. In an embodiment, the flow control message 213 is transmitted to the sending device 113 through the corresponding port 112. The flow control message 213 is configured to reduce the data rate of packets sent from the sending device 113 to the network device 100, in an embodiment. For example, in an embodiment, the control logic 226 triggers an "Xoff" indication to be transmitted to a sending device 113 if the current fill level meets a first flow control threshold and triggers an "Xon" indication if the current fill level is below the first flow control threshold. In some embodiments, the control logic 226 triggers flow control messages for a plurality of ports of the network device 100 for a corresponding plurality of sending devices which are enabled for flow control.

In some embodiments, the header parser 220 is configured to discard one or more packets based on the congestion state. For example, in an embodiment, the header parser 220 discards a packet that corresponds to a low priority value (or other suitable value of the oversubscription classification identifier) when the congestion state reaches a discard threshold associated with the low priority value. In another embodiment, the header parser 220 discards packets that correspond to the low priority value and the high priority value when the congestion state reaches a second discard threshold associated with the high priority value, without discarding packets having the low latency value of the oversubscription classification identifier. In an embodiment, the header parser 220 discards the packet prior to at least some header processing for the packet, thus freeing at least some resources of the data path portion 110 and the control path portion 120 (i.e., header scheduler 222, the packet processing array 132, and/or processing engines 136) from processing of the packet and allowing their use for other packets.

In some embodiments, the priority controller 134 is configured to discard one or more packets based on the congestion state. For example, in an embodiment, the priority controller 134 discards a packet that corresponds to a low priority value when the congestion state reaches a discard threshold associated with the low priority value. In one such embodiment, the priority controller 134 discards the packet prior to completion of the header processing for the packet, thus freeing at least some resources of the control path portion 120 (i.e., the packet processing array 132 and/or processing engines 136) from further processing of the packet and allowing their use for other packets.

The control path portion 120 is configured to determine another OS classification identifier for a packet received from the data path portion 110, in an embodiment. For example, in an embodiment, the header parser 220 determines a first OS classification identifier for a packet and the packet processing array 132 is configured to determine a second OS classification identifier for the packet. In an embodiment, the first OS classification identifier and the second OS classification identifier are selected from the same set of classification identifiers. In another embodiment, the first OS classification identifier and the second OS classification identifier are selected from different sets of classification identifiers. In an embodiment, the second OS classification for the packet, determined by the control path portion 120, overrides and/or replaces the first OS classification identifier for the packet, determined by the data path portion 110. In another embodiment, the second OS classification supplements the first OS classification identifier. In one such embodiment, the first OS classification identifier and the second OS classification identifier are both used for a determination of whether to perform further processing on the packet or discard the packet. For example, in an embodiment, the first OS classification identifier is selected from a set of identifiers (e.g., identifiers A, B, C) and the second OS classification identifier is selected from a different set of identifiers (e.g., identifiers 1, 2, 3) and thus the second OS classification supplements the first OS classification to provide a combined identifier (e.g., A2, B3, etc.). In some embodiments, the control path portion 120 does not determine the second OS classification indicator unless the congestion state indicated by the data path portion 110 reaches a congestion threshold. In an embodiment, the control path portion 120 is configured to determine the second OS classification identifier prior to performing at least some packet processing to reduce "wasted" processing power on a packet that is later discarded.

The packet processing array 132 is configured to determine the second OS classification identifier based on the header information received from the data path portion 110, in various embodiments. In an embodiment, the packet processing array 132 uses various routing, forwarding and/or other suitable databases stored in a lookup memory or the processing engines 136 to determine the second OS classification identifier. In another embodiment, the packet processing array 132 determines the second OS classification identifier based on flow characteristics associated with the packet. Examples of flow characteristics include latency of received packets, automatic repeat request algorithms and/or flow control scheme used, packet transmission rates, data transmission rates, and/or other suitable characteristics. In an embodiment, the priority controller 134 is configured to discard packets based on the second OS classification identifier, as described above with respect to the first OS classification identifier.

Referring back to FIG. 1, one or more portions of the network device 100 are implemented as hardware (e.g., a hardware processor or memory), one or more processor devices executing firmware and/or software instructions, or any suitable combination thereof, in various embodiments. In an embodiment, the parser 118 and/or parser 218 of the data path portion 110 is implemented as hardware (i.e., a hardware layer) while the priority controller 134 of the control path portion 120 is implemented as a process device executing firmware (i.e., a firmware layer) and/or software. In one such embodiment, this implementation provides generally higher speed for the parser 118 and/or parser 218 while allowing the priority controller 134 to be reconfigured at a later time (i.e., after an initial deployment) and thus to perform a "soft classification" of received packets. In an embodiment, the priority controller 134 is configured for different classification identifiers as compared to the parser 118 and/or 218. For example, in an embodiment, the priority controller 134 has a larger number of classification identifiers for finer granularity of priority classification.

In an embodiment, the parser 118 and/or parser 218 is implemented as hardware to reduce the ingress packet rate to the control path portion 120 to a packet rate that is supported by an edge interface between the data path portion 110 and the control path portion 120 (i.e., the dispatch 122 and/or reorder control block 126). In an embodiment, the priority controller 134 includes and/or stores a reconfigurable packet protocol definition which is reconfigurable for recognition of newly defined packet protocol definitions. In an embodiment, the priority controller 134 parses a header field from a received packet based on the reconfigurable packet protocol definition and selects an oversubscription classification identifier based on the extracted header field.

Figure 3:
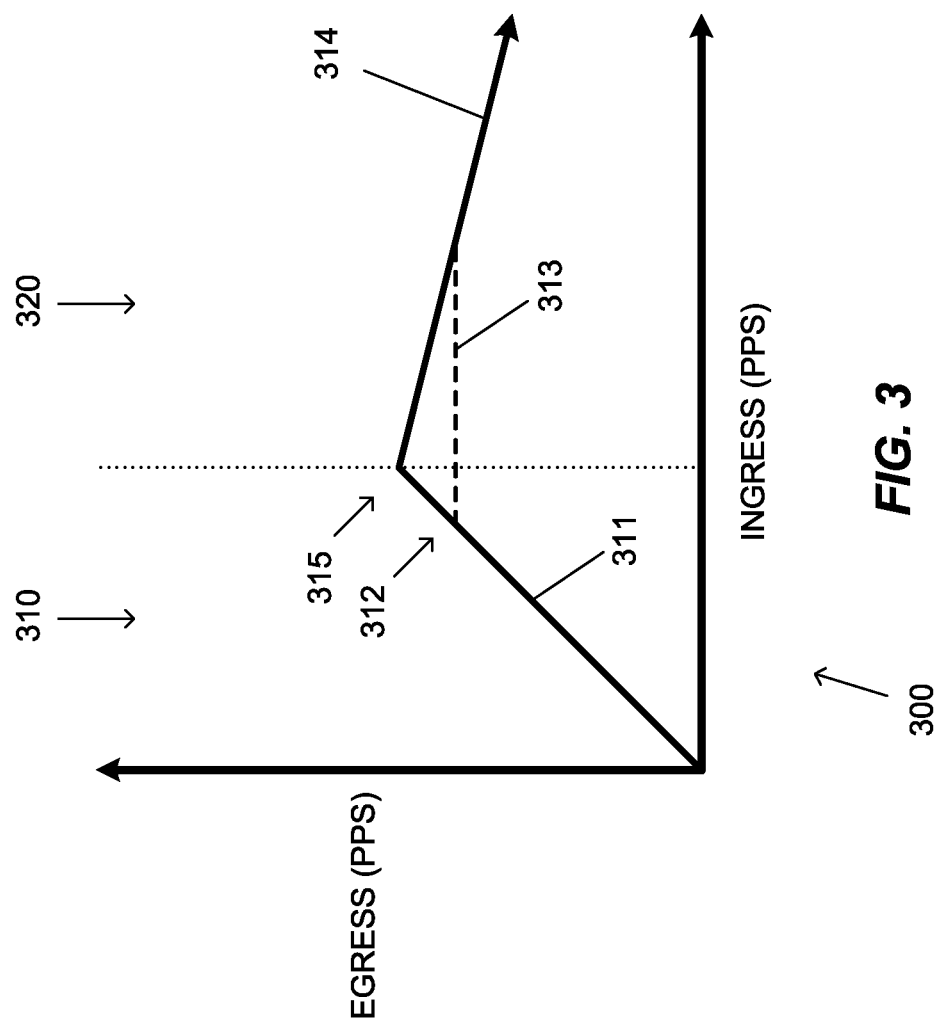
FIG. 3 is a diagram of example ingress and egress packet flow rates for packet handling by a network device, according to an embodiment.

FIG. 3 is a diagram of an example chart 300 that shows ingress and egress packet flow rates for packet handling by a network device, such as the network device 100, according to an embodiment. In a first scenario without classification or discarding of packets by the data path portion 110, during operation in a first operating region 310, the control path portion 120 is not congested and therefore the egress packet rate is generally equal to the ingress packet rate as shown by line 311. At a first point 312, a packet rate received by the control path portion 120 approaches a congestion threshold and the control path portion 120 begins determining a priority for packets and discarding those packets determined to have a low priority. However, performing the priority determination occupies at least some processing power of the control path portion 120, resulting in reduced overall performance (i.e., a same egress packet rate for an increased ingress packet rate) as shown by dashed line 313. During operation in a second operating region 320, the control path portion 120 is congested and thus the egress packet rate is less than the ingress packet rate due to packets which are discarded before egress. In this case, a slope of a line 314 corresponds to number of "wasted" processor cycles, lookups, or other processing that is performed on a packet before a decision to discard that packet is made by the control path portion 120. In a second scenario, the data path portion 110 determines the OS classification identifier and, where appropriate, discards packets prior to processing by the control path portion 120. In this second scenario, the egress packet rate continues to a peak 315 before the egress packet rate is reduced.

Figure 4:
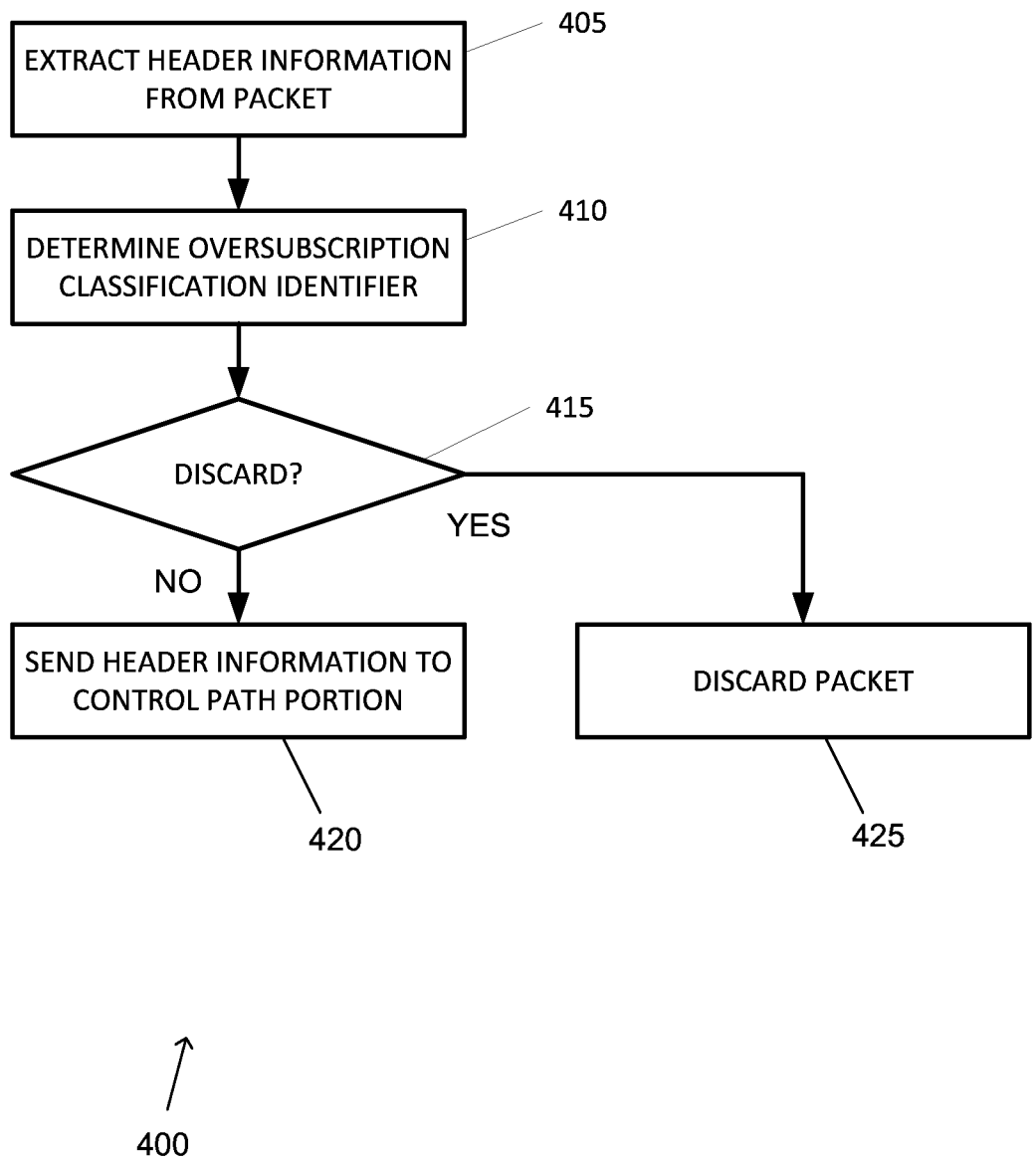
FIG. 4 is a flow diagram illustrating an example method, implemented in a network device, for processing packets, according to an embodiment.

FIG. 4 is a flow diagram illustrating an example method 400, implemented in a network device coupled to a network, for processing packets, according to an embodiment. In some embodiments, the method 400 is implemented by network device 100 of FIG. 1 or parser 218 of FIG. 2, and FIG. 4 is described with reference to FIGS. 1 and 2 for explanatory purposes. In other embodiments, however, the method 400 is implemented by another suitable network device.

At block 405, first header information is extracted from a first received packet. In an embodiment, the header information is extracted by the data path portion 110 of the network device 100. In one such embodiment, the first header information is extracted by the header parser 220. In another embodiment, the first header information is extracted by the intermediate packet buffer 114. In yet another embodiment, both the header parser 220 and the intermediate packet buffer 114 extract at least a portion of the first header information.

At block 410, a first oversubscription classification identifier for the received packet is determined based on the header information. In an embodiment, the first oversubscription classification identifier is determined by the data path portion 110, for example, by the header parser 220 as described above with respect to FIG. 2.

At block 415, it is determined whether the data path portion is congested. In an embodiment, a congestion state of the data path portion 110 is determined, for example, by the control logic 226, as described above with respect to FIG. 2. In some embodiments, the data path portion 110 discards the first received packet if the congestion state meets a discard threshold associated with the first oversubscription classification identifier or alternatively performs a different action on the first received packet. For example, in an embodiment, if it is determined at block 415 that the data path portion is not congested, then the flow proceeds to block 420.

At block 420, the data path portion 110 sends the first header information to the control path portion, for example, the control path portion 120. In an embodiment, the data path portion 110 buffers the first header information for use by the control path portion 120. In another embodiment, the data path portion 110 performs rate limiting on the first header information in combination with buffering the first header information. In some embodiments, the data path portion sends the first header information, the first oversubscription classification identifier, and the congestion state to the control path portion 120. In an embodiment, the header scheduler 222 sends the first header information to the control path portion 120 according to the priority schedule, as described above with respect to FIG. 2. In an embodiment, block 420 also includes sending the header information to a suitable header buffer 224 by the header parser 220, as described above with respect to FIG. 2.

On the other hand, if it is determined at block 415 that the data path is congested, then the flow proceeds to block 425. At block 425, the data path portion performs a different action on the first received packet based on the congestion state. In an embodiment, the packet is discarded at block 425 by the data path portion 110 if the congestion state meets a discard threshold associated with the first oversubscription classification identifier, for example, by the header parser 220. In this embodiment, the first header information is not sent to the control path portion 120, which reduces the number of packets to be processed by the control path portion 120. In another embodiment, the first header information is sent to the control path portion 120 and a flow control message is triggered, as described above with respect to FIG. 2. In yet another embodiment, the packet is discarded and the flow control message is triggered. In another embodiment, packet is stored in a congestion buffer (not shown). In one such embodiment, the congestion buffer is a deep buffer associated with the network device 100. In an embodiment, the packet is stored in the deep buffer until it is determined that the congestion state no longer meets the discard threshold or another suitable threshold.

Figure 5:
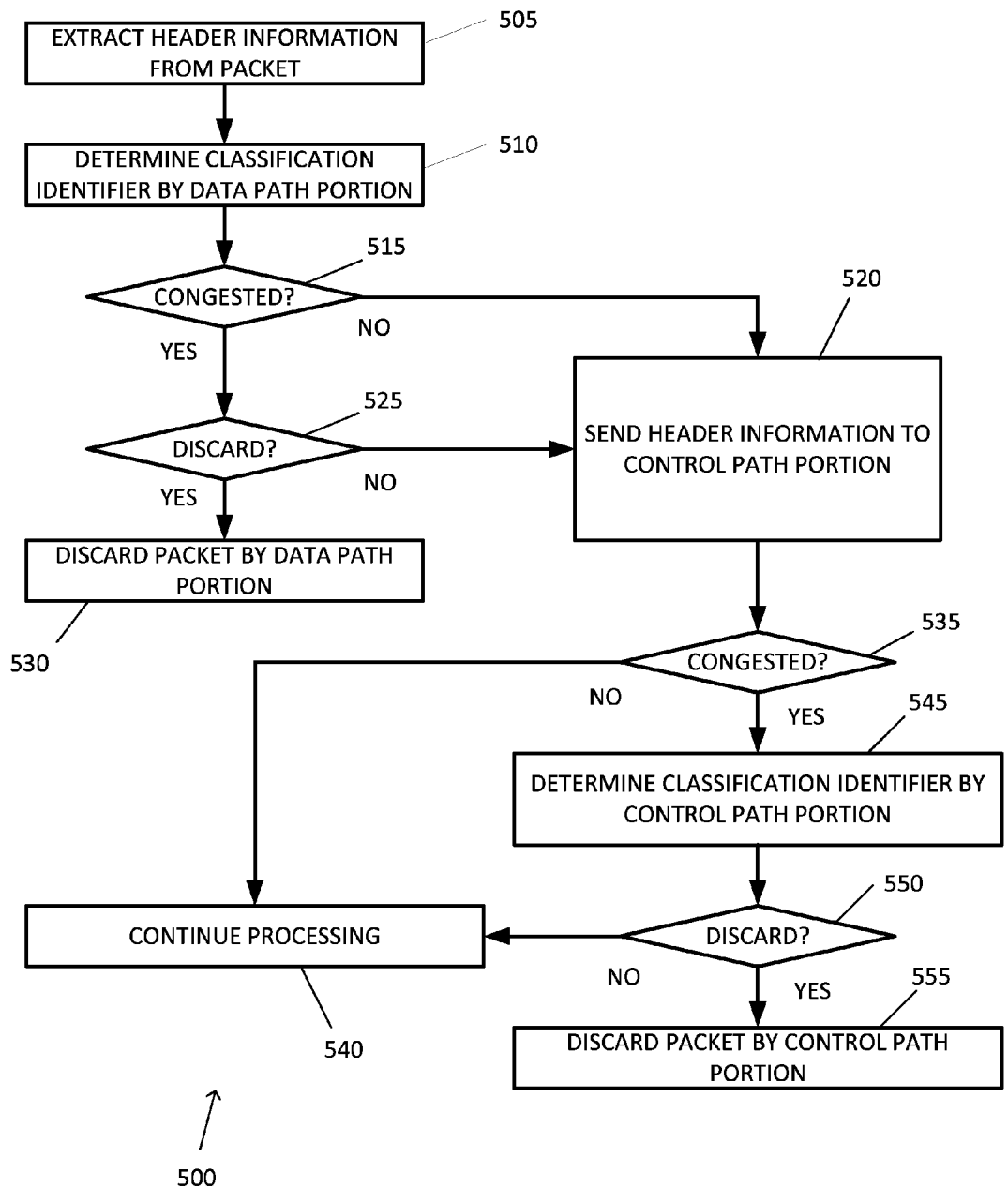
FIG. 5 is a flow diagram illustrating another example method, implemented in a network device, for processing packets, according to an embodiment.

FIG. 5 is a flow diagram illustrating an example method 500, implemented in a network device coupled to a network, for processing packets, according to an embodiment. In some embodiments, the method 500 is implemented by network device 100 of FIG. 1 or parser 218 of FIG. 2, and FIG. 4 is described with reference to FIGS. 1 and 2 for explanatory purposes. In other embodiments, however, the method 400 is implemented by another suitable network device.

At block 505, first header information is extracted from a first received packet. In an embodiment, the header information is extracted by the data path portion 110 of the network device 100. In one such embodiment, the first header information is extracted by the header parser 220. In another embodiment, the first header information is extracted by the intermediate packet buffer 114. In yet another embodiment, both the header parser 220 and the intermediate packet buffer 114 extract at least a portion of the first header information.

At block 510, a first classification identifier for the received packet is determined based on the header information. In an embodiment, the first classification identifier is determined by the data path portion 110, for example, by the header parser 220 as described above with respect to FIG. 2.

At block 515, it is determined whether the data path portion is congested. In an embodiment, a congestion state of the data path portion 110 is determined, for example, by the control logic 226, as described above with respect to FIG. 2. If it is determined at block 515 that the data path portion is not congested, then the flow proceeds to block 520. At block 520, the data path portion sends the first header information to the control path portion as described above with respect to FIG. 2 and FIG. 4 (i.e., block 420). In some embodiments, the data path portion sends the congestion state and/or the first oversubscription identifier to the control path portion. In an embodiment, the data path portion buffers or performs rate limiting on the first header information before sending the first header information to the control path portion.

On the other hand, if it is determined at block 515 that the data path is congested, then the flow proceeds to block 525. At block 525, it is determined whether the congestion state (i.e., the current fill level) meets a discard threshold associated with the classification identifier. In an embodiment, the header parser 220 determines whether the congestion state meets the discard threshold, as described above with respect to FIG. 2 and FIG. 4. If it is determined at block 525 that the discard threshold is met, then the flow proceeds to block 530. At block 530, the first received packet is discarded or a different action is performed, as described above with respect to block 425 of FIG. 4. For example, in an embodiment, if the current fill level meets a low priority discard threshold (or other suitable threshold) and the received packet has a low priority value for the classification identifier, the received packet is discarded.

On the other hand, if it is determined at block 525 that the discard threshold is not met, then the flow proceeds to block 520 as described above. At block 535, it is determined whether the data path portion is congested. In an embodiment, the control path portion 120 determines whether the data path portion is congested. In one such embodiment, the priority controller 134 receives the congestion state from the data path portion 110. For example, in an embodiment, priority controller 134 receives the congestion state message 234 from the control logic 226. In an embodiment, the congestion state is determined at block 515 for the first received packet and stored with the header information for the first received packet. In this embodiment, the priority controller 134 uses the congestion state stored with the header information. In another embodiment, the congestion state is determined at block 515 for a second received packet that is received after the first received packet. In this embodiment, the control logic 226 sends a more recent congestion state (i.e., for the second received packet) which is used, instead of the congestion state that was determined for the first received packet, to allow for clearing of the header buffers 224 while the first received packet was queued.

If it is determined at block 535 that the data path portion is not congested, then the flow proceeds to block 540. At block 540, processing of the received packet and header information is continued. For example, in an embodiment, the packet processing array 132 processes the header information and/or descriptor, and accesses various routing, forwarding and/or other suitable databases stored in a lookup memory or by the processing engines 136, to perform forwarding operations for the packet.

On the other hand, if it is determined at block 535 that the data path portion is congested, then the flow proceeds to block 545. At block 545, a second classification identifier for the received packet is determined. In an embodiment, the second classification identifier is determined by the control path portion 120, for example, by the packet processing array 132. In an embodiment, the second oversubscription classification identifier is determined based on flow characteristics associated with the first received packet. In an embodiment, the second oversubscription classification identifier is determined based on a memory lookup, database lookup, or content addressable memory lookup.

At block 550, it is determined whether the congestion state (i.e., the current fill level) meets a discard threshold associated with the second classification identifier. In an embodiment, the priority controller 134 determines whether the congestion state meets the discard threshold, as described above with respect to FIG. 2. In some embodiments, the priority controller 134 determines whether the congestion state meets the discard threshold at one or more additional times or "checkpoints" (i.e., repeating block 550) while the corresponding header information is processed by the packet processing array 132. In an embodiment, the discard decision at block 550 is also performed according to a probability value as a function of the current fill level. For example, in an embodiment, a higher fill level corresponds to a relatively higher probability of the packet being discarded.

If it is determined at block 550 that the discard threshold is met, then the flow proceeds to block 555. At block 555, the first received packet is discarded. For example, in an embodiment, if the current fill level meets a low priority discard threshold (or other suitable threshold) and the received packet has a low priority value for the second classification identifier, the received packet is discarded by the priority controller 134. On the other hand, if it is determined at block 550 that the discard threshold is not met, then the flow proceeds to block 540 as described above.

Referring to FIGS. 1, 2, and 5, in some embodiments, blocks 505, 510, 515, 520, 525, and 530 are generally performed by the data path portion 110, while the blocks 535, 540, 545, 550, and 555 are generally performed by the control path portion 120. In an embodiment, the network device 100 includes multiple data path portions which are configured to send header information and congestion states to a single control path portion. In an embodiment, the single control path portion performs flow control and/or discards packets according to a highest discard threshold which has been met by the multiple data path portions. For example, in an embodiment, a first data path portion sends low priority packets while a second data path portion sends high priority packets. In such an embodiment, the control path portion discards packets from the first data path portion in order to process high priority packets from the second data path portion based on a discard threshold of the second data path portion.

Further aspects of the present invention relate to one or more of the following clauses.

In an embodiment, a method for processing packets in a network device includes extracting at least first header information from a first packet received by a first data path portion of the network device. The first data path portion configured to buffer a data portion of received packets until the received packets are ready for transmission from the network device. The method includes determining, by the first data path portion, a first classification identifier for the first packet based on the first header information. The method also includes determining, by the first data path portion, a congestion state of the first data path portion. The congestion state indicates a received packet rate of the first data path portion that exceeds a packet handling rate of a control path portion of the network device. The method includes discarding the first packet by the first data path portion, if the congestion state meets a discard threshold associated with the first classification identifier.

In other embodiments, the method includes any suitable combination of one or more of the following features.

The method further includes: parsing at least one first header field from the first packet based on a predetermined packet protocol definition; and selecting the first classification identifier for the first packet from a set of classification values based on a pattern match of the at least one first header field.

The method further includes: scheduling the first header information for processing by the control path portion of the network device if the first packet is not discarded, the control path portion being configured to process at least header information for the received packets to determine respective ports of the network device from which the received packets should be transmitted.

The method further includes: parsing the first header information by a header parser to determine the first classification identifier; sending the first header information, by the header parser, directly to a header scheduler of the first data path portion if the first classification identifier has a first value of a set of classification values; and sending the first header information, by the header parser, to the header scheduler via a header buffer of the first data path portion if the first classification identifier has a second value of the set of classification values that corresponds to the header buffer.

The method further includes: selecting the header buffer from a plurality of header buffers, each header buffer of the plurality of header buffers corresponding to a classification value of the set of classification values.

The method further includes sending header information to the control path portion, by the header scheduler, from i) the plurality of header buffers and ii) the header parser based on a priority schedule for the set of classification values.

The method further includes: sending the first header information directly to the header scheduler if the first classification identifier has the first value of the set of classification values, the first value corresponding to a low latency packet classification.

The method further includes: determining a current fill level of the header buffer as the congestion state; and triggering a flow control message to be transmitted to a sending device if the current fill level meets a flow control threshold.

The method further includes: determining a current fill level of the header buffer as the congestion state; determining, by the control path portion, a second classification identifier for the first packet based on the first header information; and causing the first packet to be discarded if the current fill level meets a discard threshold associated with the second classification identifier.

The method further includes: parsing at least one second header field from the first packet based on a reconfigurable packet protocol definition; and selecting the second classification identifier for the first packet based on the at least one second header field parsed.

The method further includes: determining the second classification identifier by the control path portion based on flow characteristics associated with the first packet.

The method further includes: determining the second classification identifier by the control path portion based on a content addressable memory lookup.

The method further includes: adjusting the discard threshold based on the congestion state.

The congestion state is a congestion state of the first data path portion and the method further includes: extracting, by a second data path portion of the network device and for use by the control path portion, at least second header information from a second packet received by the second data path portion; determining, by the second data path portion, a second classification identifier for the second packet based on the second header information; determining, by the second data path portion, a congestion state of the second data path portion; and selectively discarding the second packet if the congestion state of the second data path portion meets a discard threshold associated with the second classification identifier or sending the second header information from the second data path portion to the control path portion.

In another embodiment, a network device includes a control path portion configured to process at least header information for received packets to determine respective ports of the network device from which the received packets should be transmitted. The network device also includes a first data path portion configured to: buffer at least a data portion of the received packets until the received packets are ready for transmission from the network device, extract first header information from a first packet received by the first data path portion, determine a first classification identifier for the first packet based on the first header information, determine a congestion state of the first data path portion, the congestion state indicating a received packet rate of the first data path portion that exceeds a packet handling rate of the control path portion, and discard the first packet, if the congestion state meets a discard threshold associated with the first classification identifier.

In other embodiments, the apparatus includes any suitable combination of one or more of the following features.

The first data path portion includes a parser configured to schedule the first header information for processing by the control path portion of the network device if the first packet is not discarded.

The parser includes a header scheduler, and a header parser configured to i) parse the first header information, ii) send the first header information directly to the header scheduler if the first classification identifier has a first value of a set of classification values, and iii) send the first header information to the header scheduler via a header buffer of the parser if the first classification identifier has a second value of the set of classification values that corresponds to the header buffer.

The header parser is configured to select the header buffer from a plurality of header buffers, each header buffer of the plurality of header buffers corresponding to a classification value of the set of classification values.

The header scheduler is configured to send the header information from i) the plurality of header buffers and ii) the header parser based on a priority schedule for the set of classification values.

The first data path portion is configured to i) parse at least one first header field from the first received packet based on a predetermined packet protocol definition, and ii) select the first oversubscription classification identifier for the first received packet from a set of classification values based on the at least one first header field.

In an embodiment, a method for processing packets in a network device includes extracting, by a first data path portion of the network device and for a control path portion of the network device, first header information from a first received packet. The first data path portion is configured to buffer a data portion of received packets until the received packets are ready for transmission from the network device. The control path portion configured to process header information for the received packets to determine respective ports of the network device from which the received packets should be transmitted. The method further includes determining, by the first data path portion, a first oversubscription classification identifier for the first received packet based on the first header information. The method also includes determining, by the first data path portion, a congestion state of the network device. The congestion state indicates a received packet rate of the first data path portion that exceeds a packet handling rate of the control path portion. The method further includes selectively discarding the first received packet if the congestion state meets a discard threshold associated with the first oversubscription classification identifier or sending the first header information from the first data path portion to the control path portion.

In other embodiments, the method includes any suitable combination of one or more of the following features.

The method further includes: parsing at least one first header field from the first received packet based on a predetermined packet protocol definition; and selecting the first oversubscription classification identifier for the first received packet from a set of classification values based on a pattern match of the at least one first header field.

The method further includes: sending the first header information directly to a header scheduler of the first data path portion if the first oversubscription classification identifier has a first classification value; sending the first header information to the header scheduler via a header buffer of the first data path portion, the header buffer corresponding to a second classification value, if the first oversubscription classification identifier has the second classification value; and sending the first header information, received from i) the header parser or ii) the header buffer, to the control path portion based on a priority schedule and the corresponding first oversubscription classification identifier.

The method further includes: sending the first header information directly to the header scheduler if the first oversubscription classification identifier has the first classification value, the first classification value corresponding to a low latency packet classification.

The method further includes: determining a current fill level of the header buffer as the congestion state; and triggering a flow control message to be transmitted to a sending device if the current fill level meets a flow control threshold.

The method further includes: discarding the first received packet if the current fill level meets the discard threshold associated with the first oversubscription classification identifier.

The method further includes: determining a current fill level of the header buffer as the congestion state; sending the current fill level to the control path portion; and causing, by the control path portion, at least one packet to be discarded if the current fill level meets the discard threshold.

The method further includes: determining a current fill level of the header buffer as the congestion state; determining, by the control path portion, a second oversubscription classification identifier for the first received packet based on the first header information; and causing the first received packet to be discarded if the current fill level meets a discard threshold associated with the second oversubscription classification identifier.

The method further includes: parsing at least one second header field from the first received packet based on a reconfigurable packet protocol definition; and selecting the second oversubscription classification identifier for the first received packet based on the at least one second header field parsed.

The method further includes: determining the second oversubscription classification identifier by the control path portion based on flow characteristics associated with the first received packet.

The method further includes: determining the second oversubscription classification identifier by the control path portion based on a content addressable memory lookup.

The congestion state is a congestion state of the first data path portion and the method further includes extracting, by a second data path portion of the network device and for the control path portion, second header information from a second received packet; determining, by the second data path portion, a second oversubscription classification identifier for the second received packet based on the second header information; determining, by the second data path portion, a congestion state of the second data path portion; and selectively discarding the second received packet if the congestion state of the second data path portion meets a discard threshold associated with the second oversubscription classification identifier or sending the second header information from the second data path portion to the control path portion.

In another embodiment, a network device includes a control path portion configured to process header information for received packets to determine respective ports of the network device from which the received packets should be transmitted. The network device also includes a first data path portion configured to buffer a data portion of the received packets until the received packets are ready for transmission from the network device, extract first header information from a first received packet, determine a first oversubscription classification identifier for the first received packet based on the first header information, determine a congestion state of the first data path portion, the congestion state indicating a received packet rate of the first data path portion that exceeds a packet handling rate of the control path portion, and selectively discard the first received packet if the congestion state meets a discard threshold associated with the first oversubscription classification identifier or send the first header information to the control path portion for packet processing.

In other embodiments, the apparatus includes any suitable combination of one or more of the following features.

The first data path portion includes a header parser configured to i) parse at least one first header field from the first received packet based on a predetermined packet protocol definition and ii) select the first oversubscription classification identifier for the first received packet from a set of classification values based on a pattern match of the at least one first header field.

The first data path portion further includes i) a header scheduler and ii) at least one header buffer. Each header buffer of the at least one header buffer corresponds to a classification value of the set of classification values. The header scheduler is configured to send packet header information, received from i) the header parser or ii) the at least one header buffer, to the control path portion based on a priority schedule and the corresponding first oversubscription classification identifier. The header parser is configured to send the first header information i) to the header scheduler if the first oversubscription classification identifier has a first classification value or ii) to a header buffer of the at least one header buffer that corresponds to a second classification value if the first oversubscription classification identifier has the second classification value.

The at least one header buffer is a first in, first out (FIFO) buffer.

The header parser is configured to send the first header information directly to the header scheduler if the first oversubscription classification identifier has the first classification value, the first classification value corresponding to a low latency packet classification.

The first data path portion further includes a buffer controller configured to i) determine a current fill level of the at least one header buffer as the congestion state, and ii) trigger a flow control message to be transmitted to a sending device if the current fill level meets a flow control threshold.

The header parser is configured to discard the first received packet if the current fill level meets the discard threshold associated with the first oversubscription classification identifier.

The first data path portion further includes a buffer controller configured to i) determine a current fill level of the at least one header buffer as the congestion state and ii) send the current fill level to the control path portion. The control path portion comprises a priority controller configured to cause at least one packet to be discarded if the current fill level meets the discard threshold.

The control path portion includes a packet processing array configured to i) determine a second oversubscription classification identifier for the first received packet based on the first header information, and ii) cause the first received packet to be discarded if the current fill level meets a discard threshold associated with the second oversubscription classification identifier.

The packet processing array includes a priority controller that is configured to i) parse at least one second header field from the first received packet based on a reconfigurable packet protocol definition, and ii) select the second oversubscription classification identifier for the first received packet based on the at least one second header field parsed from the first received packet.

The packet processing array is configured to determine the second oversubscription classification identifier based on flow characteristics associated with the first received packet.

The packet processing array is configured to determine the second oversubscription classification identifier based on a content addressable memory lookup.

The network device further includes a second data path portion configured to: extract second header information from a second received packet, determine a second oversubscription classification identifier for the second received packet based on the second header information, determine a congestion state of the second data path portion, and selectively discard the first received packet if the congestion state meets a discard threshold associated with the second oversubscription classification identifier or send the second header information to the control path portion for packet processing by the control path portion.

In an embodiment, a method for processing packets in a network device includes extracting first header information from a first packet received by a first data path portion of the network device. The first data path portion configured to buffer a data portion of received packets until the received packets are ready for transmission from the network device. The method also includes determining, by the first data path portion, a first classification identifier for the first packet based on the first header information. The method includes determining, by the first data path portion, a congestion state of the first data path portion. The congestion state indicates a received packet rate of the first data path portion that exceeds a packet handling rate of the control path portion. The method further includes discarding the first packet by the first data path portion, if the congestion state meets a discard threshold associated with the first classification identifier.

In other embodiments, the method includes any suitable combination of one or more of the following features.

The method further includes scheduling the first header information for processing by a control path portion of the network device if the first packet is not discarded, the control path portion being configured to process header information for the received packets to determine respective ports of the network device from which the received packets should be transmitted.

The method further includes: parsing the first header information by a header parser to determine the first classification identifier based on a pattern match; sending the first header information, by the header parser, directly to a header scheduler of the first data path portion if the first classification identifier has a first value of a set of classification values; and sending the first header information, by the header parser, to the header scheduler via a header buffer of the first data path portion if the first classification identifier has a second value of the set of classification values that corresponds to the header buffer.

The method further includes: selecting the header buffer from a plurality of header buffers. Each header buffer of the plurality of header buffers corresponding to a classification value of the set of classification values.

The method further includes: sending header information, by the header scheduler, from i) the plurality of header buffers and ii) the header parser based on a priority schedule for the set of classification values.

The method further includes: adjusting the discard threshold based on the congestion state.

The method further includes: parsing at least one first header field from the first received packet based on a predetermined packet protocol definition; and selecting the first oversubscription classification identifier for the first received packet from a set of classification values based on a pattern match of the at least one first header field.

In another embodiment, a network device includes a control path portion configured to process header information for received packets to determine respective ports of the network device from which the received packets should be transmitted. The network device further includes a first data path portion configured to: buffer a data portion of the received packets until the received packets are ready for transmission from the network device, extract first header information from a first packet received by the first data path portion, determine a first classification identifier for the first packet based on the first header information, determine a congestion state of the first data path portion, the congestion state indicating a received packet rate of the first data path portion that exceeds a packet handling rate of the control path portion, and discard the first packet if the congestion state meets a discard threshold associated with the first classification identifier.

In other embodiments, the apparatus includes any suitable combination of one or more of the following features.

The first data path portion includes a parser configured to schedule the first header information for processing by the control path portion of the network device if the first packet is not discarded.

The parser includes: a header scheduler, and a header parser configured to i) parse the first header information, ii) send the first header information directly to the header scheduler if the first classification identifier has a first value of a set of classification values, and iii) send the first header information to the header scheduler via a header buffer of the parser if the first classification identifier has a second value of the set of classification values that corresponds to the header buffer.

The header parser is configured to select the header buffer from a plurality of header buffers, each header buffer of the plurality of header buffers corresponding to a classification value of the set of classification values.

The header scheduler is configured to send the header information from i) the plurality of header buffers and ii) the header parser based on a priority schedule for the set of classification values.

The first data path portion is configured to adjust the discard threshold based on the congestion state.

The first data path portion is configured to i) parse at least one first header field from the first received packet based on a predetermined packet protocol definition, and ii) select the first oversubscription classification identifier for the first received packet from a set of classification values based on the at least one first header field.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for processing packets in a network device, the method comprising:

extracting at least first header information from a first packet received by a first data path portion of the network device, the first data path portion configured to buffer a data portion of received packets until the received packets are ready for transmission from the network device;

determining, by the first data path portion, a first classification identifier for the first packet based on the first header information;

determining, by the first data path portion, a congestion state of the first data path portion, the congestion state indicating a received packet rate of the first data path portion that exceeds a packet handling rate of a control path portion of the network device, the control path portion being configured to process at least header information for the received packets to determine respective ports of the network device from which the received packets should be transmitted; and discarding the first packet by the first data path portion, if the congestion state meets a discard threshold associated with the first classification identifier.

2. The method of claim 1, wherein determining the first classification identifier comprises:

parsing at least one first header field from the first packet based on a predetermined packet protocol definition; and selecting the first classification identifier for the first packet from a set of classification values based on a pattern match of the at least one first header field.

3. The method of claim 1, further comprising scheduling the first header information for processing by the control path portion of the network device if the first packet is not discarded.

4. The method of claim 3, wherein scheduling the first header information comprises:

parsing the first header information by a header parser to determine the first classification identifier;

sending the first header information, by the header parser, directly to a header scheduler of the first data path portion if the first classification identifier has a first value of a set of classification values; and sending the first header information, by the header parser, to the header scheduler via a header buffer of the first data path portion if the first classification identifier has a second value of the set of classification values that corresponds to the header buffer.

5. The method of claim 4, wherein sending the first header information to the header scheduler via the header buffer comprises selecting the header buffer from a plurality of header buffers, each header buffer of the plurality of header buffers corresponding to a classification value of the set of classification values.

6. The method of claim 5, further comprising:

sending header information to the control path portion, by the header scheduler, from i) the plurality of header buffers and ii) the header parser based on a priority schedule for the set of classification values.

7. The method of claim 4, wherein sending the first header information directly to the header scheduler comprises sending the first header information directly to the header scheduler if the first classification identifier has the first value of the set of classification values, the first value corresponding to a low latency packet classification.

8. The method of claim 4, further comprising:

determining a current fill level of the header buffer as the congestion state; and triggering a flow control message to be transmitted to a sending device if the current fill level meets a flow control threshold.

9. The method of claim 4, further comprising:

determining a current fill level of the header buffer as the congestion state;

determining, by the control path portion, a second classification identifier for the first packet based on the first header information; and causing the first packet to be discarded if the current fill level meets a discard threshold associated with the second classification identifier.

10. The method of claim 9, wherein determining the second classification identifier comprises:

parsing at least one second header field from the first packet based on a reconfigurable packet protocol definition; and selecting the second classification identifier for the first packet based on the at least one second header field parsed.

11. The method of claim 9, wherein determining the second classification identifier comprises determining the second classification identifier by the control path portion based on flow characteristics associated with the first packet.

12. The method of claim 9, determining the second classification identifier comprises determining the second classification identifier by the control path portion based on a content addressable memory lookup.

13. The method of claim 1, further comprising adjusting the discard threshold based on the congestion state.

14. The method of claim 1, wherein the congestion state is a congestion state of the first data path portion, the method further comprising:

extracting, by a second data path portion of the network device and for use by the control path portion, at least second header information from a second packet received by the second data path portion;

determining, by the second data path portion, a second classification identifier for the second packet based on the second header information;

determining, by the second data path portion, a congestion state of the second data path portion; and selectively discarding the second packet if the congestion state of the second data path portion meets a discard threshold associated with the second classification identifier or sending the second header information from the second data path portion to the control path portion.

15. A network device, comprising:

a control path portion configured to process at least header information for received packets to determine respective ports of the network device from which the received packets should be transmitted; and a first data path portion configured to:
buffer at least a data portion of the received packets until the received packets are ready for transmission from the network device, extract first header information from a first packet received by the first data path portion, determine a first classification identifier for the first packet based on the first header information, determine a congestion state of the first data path portion, the congestion state indicating a received packet rate of the first data path portion that exceeds a packet handling rate of the control path portion, and discard the first packet, if the congestion state meets a discard threshold associated with the first classification identifier.

16. The network device of claim 15, the first data path portion comprising a parser configured to schedule the first header information for processing by the control path portion of the network device if the first packet is not discarded.

17. The network device of claim 16, wherein the parser comprises:
 a header scheduler, and
 a header parser configured to i) parse the first header information, ii) send the first header information directly to the header scheduler if the first classification identifier has a first value of a set of classification values, and iii) send the first header information to the header scheduler via a header buffer of the parser if the first classification identifier has a second value of the set of classification values that corresponds to the header buffer.

18. The network device of claim 17, wherein the header parser is configured to select the header buffer from a plurality of header buffers, each header buffer of the plurality of header buffers corresponding to a classification value of the set of classification values.

19. The network device of claim 18, wherein the header scheduler is configured to send the header information from i) the plurality of header buffers and ii) the header parser based on a priority schedule for the set of classification values.

20. The network device of claim 15, wherein the first data path portion is configured to i) parse at least one first header field from the first received packet based on a predetermined packet protocol definition, and ii) select the first oversubscription classification identifier for the first received packet from a set of classification values based on the at least one first header field.

* * * * *